(No Model.)
H. HAMLIN.
PROCESS OF AND MEANS FOR PURIFYING GLUCOSE.
No. 256,835.                              Patented Apr. 25, 1882.
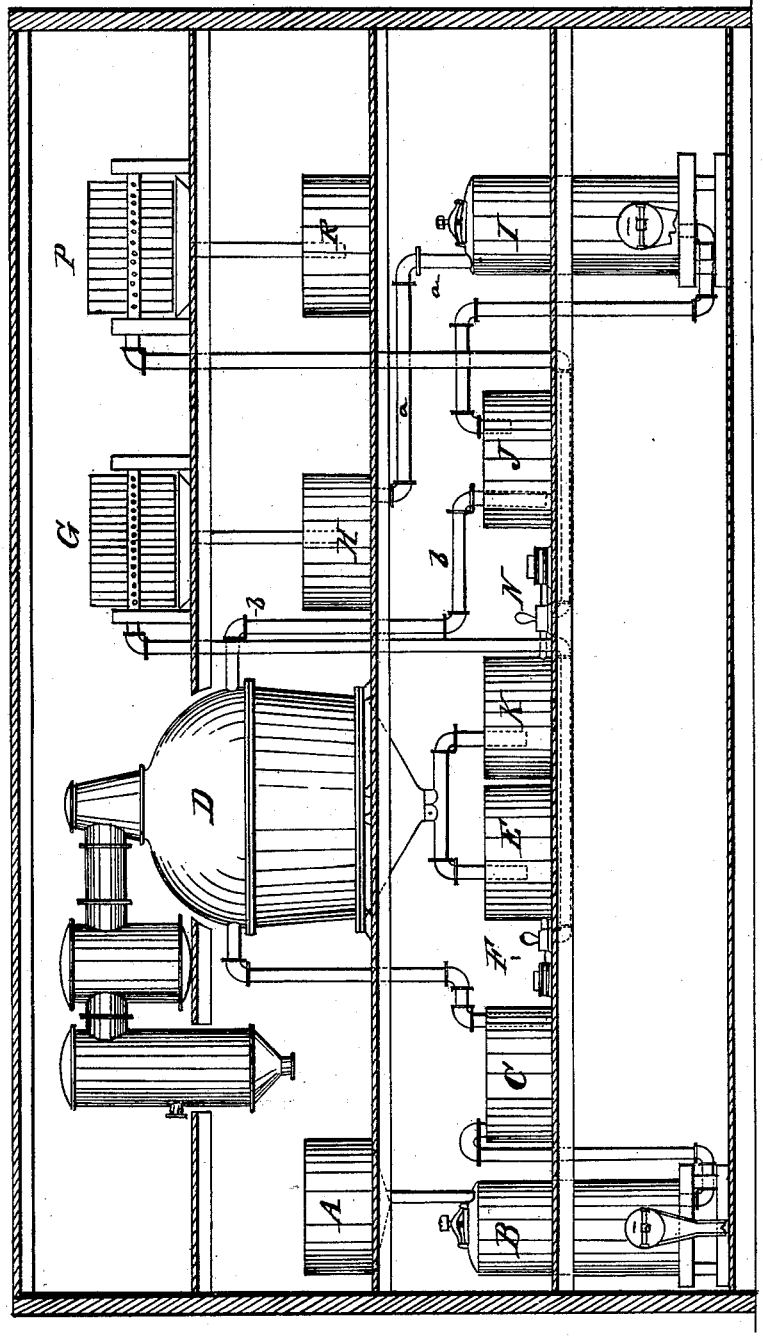
WITNESSES:                                INVENTOR
Geo. H. Sonneborn                         Harry Hamlin
W. G. Button                              BY John R. Bennett
                                          ATTORNEY

UNITED STATES PATENT OFFICE.

HARRY HAMLIN, OF BUFFALO, NEW YORK.

PROCESS OF AND MEANS FOR PURIFYING GLUCOSE.

SPECIFICATION forming part of Letters Patent No. 256,835, dated April 25, 1882.

Application filed March 17, 1882. (No model.)

*To all whom it may concern:*

Be it known that I, HARRY HAMLIN, of Buffalo, in the county of Erie and State of New York, have made an invention of certain new and useful Improvements in the Process of and Means for Purifying Glucose; and I do hereby declare that the following, in connection with the accompanying drawing, is a full, clear, and exact description and specification of the same.

This invention relates to the process and means employed for the concentration and purification of glucose or sirup of grape-sugar; and the invention consists of an improvement in the process, and of certain new combinations of apparatus which are recited in detail in the claims at the close of this specification.

In order that my said invention may be fully understood, I have represented in the accompanying drawing the combination of apparatus which I have employed with success, and I will proceed to describe the same.

The drawing represents an elevation of the apparatus arranged for convenience upon several floors of a sugar-house.

Previous to my invention sirups have been filtered through bone-black interveniently with concentration for the purpose of decolorizing them, the concentration being divided into two stages separated by an intervening filtration by means of bone-black. Such intervenient filtration of glucose, however, is attended with the difficulty that the tendency of the lime salts contained in the glucose to deposit upon bone-black is enhanced by the concentration of the liquor, and consequently the bone-black filters employed for the intervening filtration become rapidly clogged by the deposit of lime salts and require the frequent renewal of the bone-black. I have discovered that such deposit upon the bone-black of lime salts during the intervening filtration of glucose can be greatly reduced by a preliminary filtration of the partially-concentrated material through mechanical filters, and the process portion of my invention is based upon this discovery.

In practicing my invention the glucose liquor from the converter is received into a tank, A, whence it passes through the usual bone-black filter, B, and is discharged into the tank C, from which the vacuum-pan D is supplied. By the use of this bone-black filter B the glucose is decolorized more or less perfectly previous to concentration. The first stage of concentration is then effected in the vacuum-pan, and it may be carried on until the liquor attains a density of about 28° Baumé. The liquor thus partially concentrated is discharged into the tank E. From this tank the liquor is pumped by means of the pump F through the press-filter G, as a condition precedent to a second or intervening filtration through bone-black. The filtered liquor from the press-filter G is received in the tank H, whence it passes through the pipe $a$ to the intervening bone-black filter I, and is discharged therefrom into the tank J, ready for the second stage of the concentration. This second stage may be conveniently effected in the same vacuum-pan D in which the first stage was effected; or an additional vacuum-pan may be used for the purpose. As the apparatus represented in the drawing is arranged upon the former system, the partly-concentrated and doubly-filtered liquor from the tank J is received into the vacuum-pan through the pipe $b$, and is concentrated to the required extent—say to about 42° Baumé. The sirup thereby produced is discharged into the tank K, whence it is pumped by means of a pump, N, through a terminal filter, P, and is delivered into the receiving-tank R.

The various pipes, represented in the drawing as combining the several members of the apparatus, are in practice provided with suitable gates or valves to close and open them. The bone-black filters B I are constructed and filled in the ordinary way practiced in sugar-houses. The press-filters G P for the mechanical filtration also are constructed and operated in the ordinary way used in sugar-houses, or they may be replaced by the common bag-filters.

From the above description it appears that the concentration of the liquor is effected at two stages, and that between these two stages the partially-concentrated liquor from the first stage is purified by being subjected not only to the intervening filtration through the bone-black filter I for decolorization, but also to an intervening preliminary mechanical filtration through the press-filter G, the practical effect of which is to separate from the partly-concentrated liquor a large portion of lime salts before the liquor passes into the bone-black filter I, and to prevent such salts as are removed by said mechanical filtration from depositing upon the bone-black of the said intervening bone-black filter I. The practical result is a great economy in the expenditure of bone-black required for filtering glucose.

The apparatus described may be arranged otherwise than as represented in the drawing, and the number of tanks and filters may be increased as required by the amount of material to be treated, the bone-black filters B and I and the mechanical filters G and P each being one of a series employed in a sugar-house.

As all of the devices described by me are well known when considered separately, I do not claim any one of them as my invention.

I claim, however, as my invention—

1. The process, substantially as before set forth, of concentrating and purifying glucose, consisting of the concentration of the glucose liquor at two stages with both an intervening mechanical filtration and an intervening filtration through bone-black of the partly-concentrated liquor previous to the second stage of concentration.

2. The process, substantially as before set forth, of concentrating and purifying glucose, consisting of the concentration of the glucose liquor at two stages with an intervening mechanical filtration of the partly-concentrated liquor and an intervening filtration of it through bone-black, and with a mechanical filtration of the sirup after the second stage of concentration.

3. The combination, substantially as before set forth, of the vacuum-pan, the intervening mechanical filter, and the intervening bone-black filter, the whole constituting an apparatus for the concentration and purification of glucose liquor.

4. The combination, substantially as before set forth, of the vacuum-pan, the intervening mechanical filter, the intervening bone-black filter, and the terminal mechanical filter, the whole constituting an apparatus for the concentration and purification of glucose liquor.

Witness my hand this 30th day of January, A. D. 1882.

HARRY HAMLIN.

Witnesses:
W. L. BENNEM,
EDW. R. BREVOORT.